United States Patent [19]
Kingsland

[11] 3,901,607
[45] Aug. 26, 1975

[54] HIGH APERTURE REFLECTION PHOTODETECTOR APPARATUS

[75] Inventor: David O. Kingsland, Fairport, N.Y.

[73] Assignee: Xerox Corporation, Stamford, Conn.

[22] Filed: Feb. 21, 1974

[21] Appl. No.: 444,454

[52] U.S. Cl. ............................ 356/199; 250/561
[51] Int. Cl. .................... G01n 21/18; G01n 21/30
[58] Field of Search ................. 250/571, 572, 561; 356/199, 200

[56] References Cited
UNITED STATES PATENTS

| | | | |
|---|---|---|---|
| 3,223,944 | 12/1965 | Luck, Jr. et al. | 331/94.5 P |
| 3,338,130 | 8/1967 | Gaffard | 356/200 |
| 3,360,652 | 12/1967 | Bernous | 250/561 |
| 3,450,887 | 6/1969 | Nirenberg | 250/561 |

Primary Examiner—Vincent P. McGraw
Attorney, Agent, or Firm—Robert J. Bird

[57] ABSTRACT

An optical sensing device to monitor the flow of cut sheet material is disclosed. A light source and photodetector are mounted on one side of the flow path and a concave reflector on the other side.

In one embodiment, the reflector is spherical with its center of curvature midway between light source and photodetector. In another embodiment, the reflector is ellipsoidal having its foci at the light source and photodetector. In either case, the entire cone of light from the light source subtended by the reflector is directed to the photodetector.

Material flowing in discrete units between the light source-photodetector and the reflector alternately closes and opens optical communication in the device for purposes of controlling some related function.

5 Claims, 2 Drawing Figures

HIGH APERTURE REFLECTION PHOTODETECTOR APPARATUS

BACKGROUND OF THE INVENTION

This invention relates to optical sensing devices in general, and more particularly to an optical sensing device to monitor the flow of material in discrete units such as paper. Such a monitoring device may be used, for example, in photocopying machines to effect various controls of the machine operation in response to the on-off condition of the photodetector. A particular example where this invention might be applied in a photocopying machine environment is in association with an inverter-reverser mechanism to periodically signal the paper drive to reverse itself. Another example is in a collating apparatus where the signal from this optical sensing device may be used to position one of a set of collection trays in place. These examples are not limiting however, and it will be apppreciated that in any environment in which sheet or other material is moved in discrete units, it may be useful to indicate its presence at a particular point and also to signal and initiate a related event in response to such position.

SUMMARY OF THE INVENTION

It is an object of this invention to provide a noncontact sensing device to replace sensing devices requiring mechanical contact.

Another object is to provide an optical sensing device including light source and photodetector of increased light-gathering ability.

Another object is to provide an optical sensing device which, because of its greater aperture, is relatively insensitive to assembly accuracy due to its optical depth of focus and size of light source which overfills the actinic area of the detector.

Briefly, this invention is practiced in one form by a light source and photodetector combination, mounted side by side and separated by an opaque divider. The light source and photodetector are placed on one side of a path of paper or other material moving in discrete units. On the opposite side of the flow path, a concave reflector is mounted facing the light source and photodetector to reflect light from the source to the photodetector in the absence of some material blocking the optical path.

For a better understanding of this invention, reference is made to the following detailed description given in connection with the accompanying drawings.

DRAWINGS

DESCRIPTION

Figure 1:
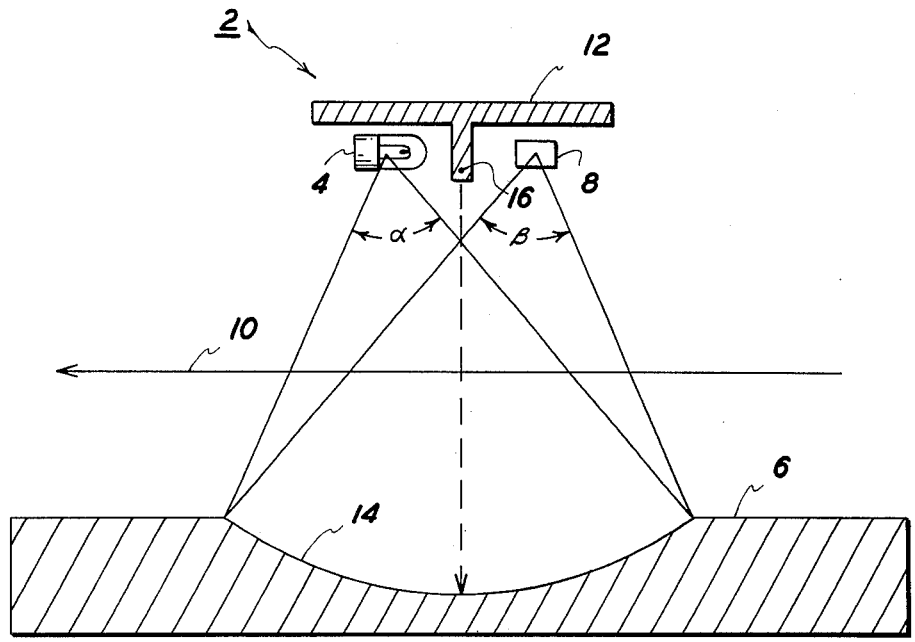
FIG. 1 is a schematic side elevation view of an optical sensing device disposed relative to the path of a material flowing in discrete units.

With reference to FIG. 1, an optical sensing device according to this invention is generally indicated at 2 and includes a light source 4, a concave mirror or reflector 6, and a photodetector 8. Light source 4 and photodetector 8 are on one side, and reflector 6 on the other side, of the path 10 along which flows paper or other material in discrete units. Light source 4 and photodetector 8 are positioned relatively close together but are separated by an opaque divider 12, to which light source 4 and photodetector 8 may be mounted to form an integral unit.

Reflector 6 has a spherical reflector surface 14, the center of curvature 16 of which is midway between centers of the light source 4 and photodetector 8 so that the light source 4 is imaged onto the photodetector 8 by the spherical reflector 6.

The passage of a sheet of paper or the like along flow path 10 shutters the light source-reflector-photodetector optical path, interrupting the photodetector signal for such use as may be made thereof. Preferably, the flow of paper or the like along flow path 10 is in the direction from right to left as shown in the drawing. This flow direction tends to shutter the photodetector before the paper becomes fully illuminated by the light source. In this way, the possibility of diffusely reflected radiation from the upper surface of the paper preventing a sufficient signal loss to trigger photodetector 8 is reduced.

The spherical reflector 6 subtends a solid angle $\alpha$ of the light from light source 4. Accordingly, substantially the same solid angle B of light is reflected and imaged at the photodetector 8. Thus, the system has a substantially greater aperture or light gathering ability as compared to prior art devices as exemplified in U.S. Pat. No. 2,171,362 (FIG. 5) in which very small apertures and very narrow beams of light are used.

Because of the large aperture and resulting light gathering ability of this system, the photodetector 8 receives a reflected image of the lamp 4 of such high irradiance that background irradiance (ambient light or noise) and diffusely reflected energy from the paper surface are easily biased out. In addition, because of the high irradiance level, the spherical reflector does not require such precision in either curvature or placement as was heretofore required for the relative positioning of light source and photodetector in which narrow light beams were used. Preferably, the light source 4 and photodetector 8 are integral with the opaque divider 12, assembled as a unit to obviate the need to align all these elements during machine assembly. Again, because of the high level of irradiance which this system can transmit from light source to photodetector, it has been shown possible to use less expensive photodetectors whose nominal sensitivity varies from one to another production lot. In addition, for the same reason, the light source output can be reduced by reducing voltage which increases its lifetime relative to that of the machine.

Figure 2:
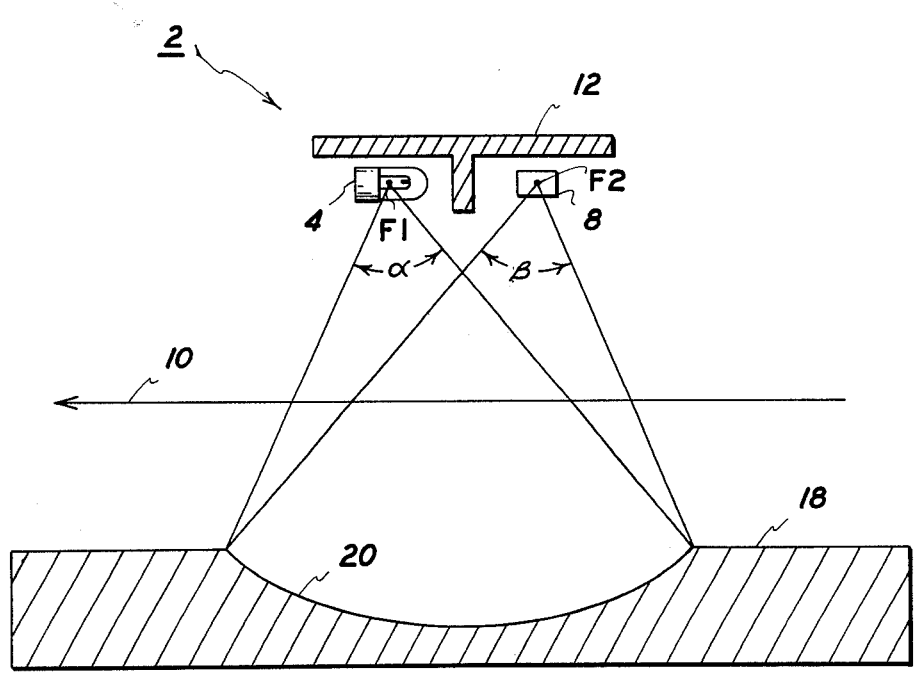
FIG. 2 is a similar view showing another embodiment of this invention.

Referring now to FIG. 2, a similar arrangement is shown with identical elements given the same numbers. In this case, the concave mirror or reflector is designated at 18 and has an ellipsoidal reflector surface 20. The foci $F_1$ and $F_2$ of the ellipsoidal surface 20 are, respectively, at the light source 4 and photodetector 8 so that the light from source 4 is reflected and imaged at 8.

The advantages discussed above in connection with the spherical reflector 6 also obtain with the ellipsoidal reflector 18. In fact, the ellipsoidal reflector may be more ideal geometrically and theoretically while the spherical reflector may be more practical because more easily and economically produced.

The foregoing description of an embodiment of this invention is given by way of illustration and not of limitation. The concept and scope of the invention are limited only by the following claims and equivalents thereof which may occur to others skilled in the art.

What is claimed is:

1. An optical sensing device for sensing the presence and absence of material flowing in discrete units along a flow path, including:
   a light source,
   a photodetector,
   an opaque divider between said light source and said photodetector,
   a reflector having a spherical reflecting surface, the center of curvature of said reflecting surface lying midway between said light source and said photodetector,
   said light source and said photodetector being respectively in object and image conjugate relationship with said reflector,
   said light source, photodetector, and divider being positioned on one side of said flow path, and said reflector being positioned on the opposite side of said flow path so that material flowing therealong in discrete units alternately closes and opens optical communication along an optical path including said light source, said reflector, and said photodetector.

2. An optical sensing device as defined in claim 1 in which said light source, said photodetector, and said divider are an integral unit.

3. An optical sensing device for sensing the presence and absence of material flowing in discrete units along a flow path, including:
   a light source,
   a photodetector,
   an opaque divider between said light source and said photodetector,
   a reflector having a concave reflecting surface facing said light source and said photodetector,
   said light source and said photodetector being respectively in object and image conjugate relationship with said reflector,
   said light source, photodetector, and divider being positioned on one side of said flow path, and said reflector being positioned on the opposite side of said flow path so that material flowing therealong in discrete units alternately closes and opens optical communication along an optical path including said light source, said reflector, and said photodetector.

4. An optical sensing device as defined in claim 3 in which said concave reflecting surface is ellipsoidal being defined by two focal points, one of said focal points being at said light source, the other of said focal points being at said photodetector.

5. An optical sensing device as defined in claim 3 in which said light source, said photodetector, and said divider are an integral unit.

* * * * *